May 17, 1949.  W. MAKY  2,470,508
COUPLING FOR TUBES
Filed Sept. 22, 1944
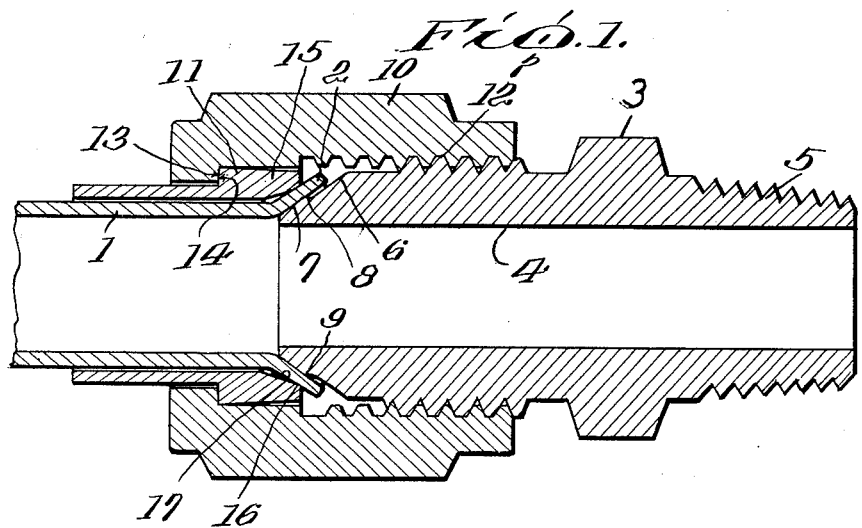
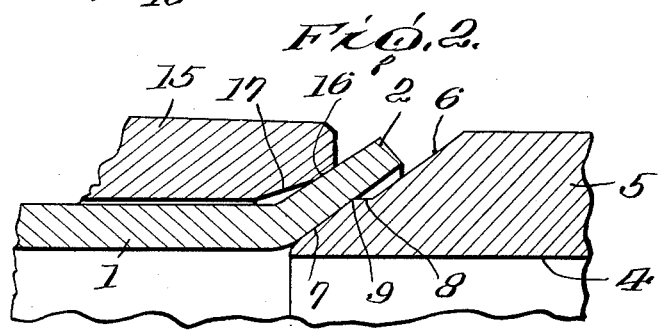
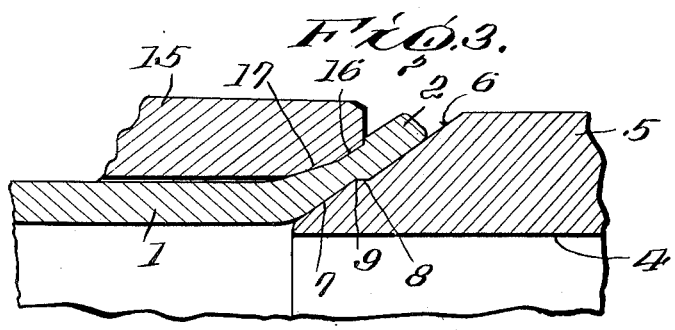
Walter Maky    Inventor
By  Mason, Porter & Diller
      Attorneys Patented May 17, 1949

2,470,508

UNITED STATES PATENT OFFICE 2,470,508

COUPLING FOR TUBES

Walter Maky, Cleveland, Ohio, assignor to The Parker Appliance Company, Cleveland, Ohio, a corporation of Ohio Application September 22, 1944, Serial No. 555,327

1 Claim. (Cl. 285—86)

The invention relates to new and useful improvements in tube couplings and more particularly to an improvement in a coupling adapted for clamping the flared end of a metal tube such as is typified in United States Letters Patent No. 2,212,183 granted Arthur L. Parker, August 20, 1940.

An object of the invention is to provide a coupling of the above type wherein the male seat is shaped so as to provide an outer conical portion and an inner conical portion diposed relative to each other so that the inner conical portion is initially contacted with by the flared end of the tube.

A further object of the invention is to provide a coupling of the above type wherein the outer conical portion and the inner conical portion are separated by a sharp edge, and wherein the clamping member engaging the outer face of the flared end of the tube is so shaped as to initially contact with the outer face of the flared end of the tube so as to bend said outer end over said sharp edge into contact with the outer conical face of the male seat.

These and other objects will in part be obvious and will in part be hereinafter more fully disclosed.

In the drawings,

Fig. 1 is a longitudinal sectional view through a coupling embodying the improvements with the tube in place and the coupling hand tightened.

Fig. 2 is an enlarged view of the flared end of the tube and the clamping portions of the coupling showing more or less diagrammatically the shaping of the parts and the position thereof when the female coupling member has been hand tightened against the flared end of the tube.

Fig. 3 is a view similar to Fig. 2 but showing the coupling completely closed by the usual torque pressure.

The invention is directed to a coupling for tubes having the ends thereof flared. In the drawings the tube is indicated at 1 and the flared end of the tube at 2. The coupling, as illustrated, includes a coupling member 3 having a bore 4 therethrough. The outer end of the coupling member 3 is threaded as indicated at 5 for attachment to any suitable device. This coupling member is usually referred to as the body member to which the tube 1 is to be connected.

The coupling 3 has at its inner end a male seat which includes an outer conical portion 6 and an inner conical portion 7. The outer conical portion 6 is offset inwardly from the line of the inner conical portion 7. As shown, these conical portions are formed substantially on the same angle. The conical portions are separated by a shoulder 8 having a sharp edge 9. The angle of the conical portions of the male seat are preferably substantially the same as the angle of the inner face of the flared end 2 of the tube. Therefore, when said flared end of the tube is placed against the conical portion 7 the outer end of the tube will be spaced outwardly from the conical portion 6.

The flared end of the tube is clamped against the male seat by a coupling member which includes a nut 10 and a sleeve 11. The nut 10 has a threaded connection 12 with the body member or coupling 3. The nut has a shoulder 13 which engages a shoulder 14 on the sleeve 11 and forces the clamping head 15 against the flared end of the tube when the nut is threaded onto the body member. The clamping head 15 is provided with an outer conical portion 16 and an inner conical portion 17. The outer conical portion 16 is so diposed relative to the conical portion 7 on the male seat that when the sleeve is forced against the flared end of the tube the outer end of the tube will be bent over the sharp edge 9 and forced into intimate contact with the outer conical portion 6 of the male seat.

When the male seat is formed on an angle of thirty-seven degrees, then the conical portion 16 is preferably formed on an angle of thirty-three degrees and the conical portion 17 on an angle of eighteen and one-half degrees. These angles may be varied and are referred to only as illustrative of the relative shaping of the parts.

As pressure is applied to the sleeve for clamping the flared end of the tube against the male seat said head will be slightly expanded and the flared end of the tube will be sufficiently deformed so that in the final clamping action the inner conical portion 17 on the sleeve head will make contact with the outer face of the flared end of the tube, as shown in Fig. 3.

It will be noted that the inner conical portion 7 is of relatively small area and this results in a tight seal being produced by a relatively low turning torque. In the final closing of the coupling the outer end of the flared end of the tube is brought into contact with the outer conical portion of the male seat, as has already been stated. This limits the extent of the bending of the outer end of the flared end of the tube and also provides an additional seating and sealing surface.

The outer conical surface on the head of the clamping sleeve when pressed against the flared end of the tube forces said flared end against the sharp edge 9 and produces a sort of wedging action which tends to force the metal of the tube over the sharp edge and this establishes a tight seal. Furthermore, this bending of the outer end of the flared end of the tube over the sharp edge and against the outer conical portion of the male seat greatly increases the pull-out resistance of the tube flare.

It will be understood that the manner of clamping the flared end of the tube against the male seat may be greatly modified and also the shaping of the parts may be modified without departing from the spirit of the invention as set forth in the appended claim.

I claim:

A coupling for metal tubes having the ends thereof flared comprising coupling members having a threaded connection, one of said members having a seat against which the flared end of the tube is clamped, said seat having an inner conical portion and an outer conical portion substantially parallel thereto which is offset inwardly of the inner conical portion so as to provide a shoulder therebetween so that the inner portion of the flared end of the tube contacts initially with said inner conical portion of the seat, the other coupling member having associated therewith a clamping head provided with an outer conical portion disposed radially outwardly from said shoulder so as to initially engage the outer face of the flared end of the tube in the region opposed to the outer conical portion on the seat so that the end of the tube will be bent over said shoulder into intimate contact with said outer conical portion of the seat when the coupling is closed, said head having an inner conical surface initially out of contact with the flared end of the tube and adapted to clamp the flared end of the tube against the inner conical portion on the seat when said coupling is closed.

WALTER MAKY.

REFERENCES CITED

The following references are of record in the file of this patent:

UNITED STATES PATENTS

| Number | Name | Date |
| --- | --- | --- |
| 802,853 | Garner et al. | Oct. 24, 1905 |
| 2,212,183 | Parker | Aug. 20, 1940 |
| 2,267,416 | Neukirch | Dec. 23, 1941 |
| 2,289,382 | Parker | July 14, 1942 |
| 2,316,711 | Parker et al. | Apr. 13, 1943 |

FOREIGN PATENTS

| Number | Country | Date |
| --- | --- | --- |
| 437,510 | Great Britain | Oct. 30, 1935 |